Patented May 25, 1937

2,081,874

UNITED STATES PATENT OFFICE 2,081,874

DYESTUFFS OF THE ANTHRAQUINONE SERIES

William H. Lycan, South Milwaukee, Wis., assignor to E. I. du Pont de Nemours & Company, Wilmington, Del., a corporation of Delaware No Drawing. Application November 22, 1935, Serial No. 51,079

7 Claims. (Cl. 260—36)

This invention relates to the preparation of new vat dyestuffs of the anthraquinone-2,1(N)-benzacridone series and has for its object the preparation of new compounds which dye in gray to black shades and which exhibit good fastness properties.

In my copending application, U. S. Serial No. 51,078, filed of even date herewith, I have described the preparation of new anthraquinone-benzacridone-benzanthrone imides of the general formula:

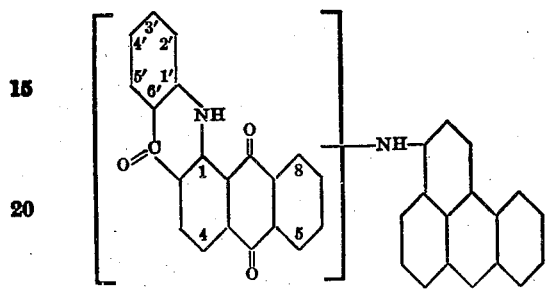

wherein the benzanthrone imide group is attached in the 4, 5 or 8-position of the anthraquinone nucleus. These intermediates may be prepared by condensing an alpha-amino- (or corresponding alpha-halogen) anthraquinone-2,1(N)-benzacridone with a Bz-1-halogen- (or corresponding Bz-1-amino) benzanthrone respectively, by the procedure usually employed in the preparation of anthrimides.

I have found that these new intermediate compounds can be converted into new and valuable dyestuffs by subjecting them to the action of alkaline condensing agents, such as, for example, alcoholic potash, caustic potash in aniline, sodium anilide in aniline, or alkali metal alcoholates in aniline. The exact structure of the resulting dyestuffs has not been definitely established although it is believed that a ring-closure is effected with the possible formation of an acridine ring, giving, in the case of the 5-(anthraquinone-2,1(N)-benzacridone) Bz-1-benzanthrone imide, for instance, a compound of the probable formula:

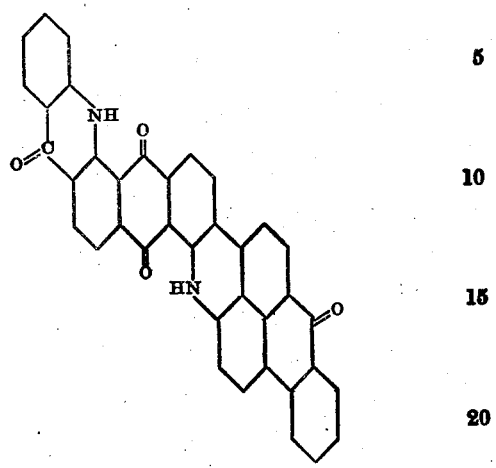

My invention, however, resides in the new dyestuffs, prepared by the alkaline condensation of the Bz-1-benzanthrone imide compounds of the class disclosed in copending application, Serial No. 51,078 irrespective of what formula may be ascribed thereto.

The condensation may be effected at temperatures of from about 100° to about 180° C., the particular temperature used depending in some degree upon the particular condensing agent employed. At the lower temperatures the reaction time must be increased. Temperatures above 180° C. tend to decompose the reaction product, thereby materially reducing the yields.

The products are, in general, black powders yielding olive to brown solutions in sulfuric acid. The color of these solutions in sulfuric acid usually changes to olive to green on standing or upon heating. Upon acid pasting in concentrated sulfuric acid the products become more soluble in the vat and their dyeing properties are improved. The products yield violet colored hydrosulfite vats from which cotton is dyed gray to black shades of good fastness properties.

The following examples are given to more fully illustrate my invention. The parts used are parts by weight.

Example I 400 parts of caustic potash are heated with 160 parts of anhydrous methanol at 140–150° C. and at this temperature 80 parts of the condensation product of 5-amino-anthraquinone-2,1(N)-benzacridone and Bz-1-bromo-benzanthrone are slowly added. The melt is held under strong agitation at 150–155° C. until the reaction is complete, which requires from 1 to 2 hours, and is then poured into 5000 parts of water under strong agitation. The resulting solution is aerated until the dyestuff has been completely precipitated after which it is filtered and the residue washed free from alkali, and dried.

The product is a black powder yielding an olive brown solution in sulfuric acid. It is then dissolved in 800 parts of 98% sulfuric acid and the solution stirred for several hours at room temperature, then poured slowly into 8000 parts of cold water and the product removed by filtration. After washing acid free, the residue may be thoroughly milled to yield a smooth black paste. It is soluble in alkaline hydrosulfite to yield a deep violet vat from which cotton is dyed in strong reddish gray to black shades. The product is also suitable for printing, and both dyeings and prints exhibit good fastness qualities.

Example II

A melt is prepared by heating 125 parts of caustic potash in 80 parts of ethyl alcohol at 120° C. 25 parts of the condensation product of 8-amino-anthraquinone - 2,1(N) - benzacridone and Bz-1-bromo-benzanthrone are then slowly added to this melt at 125–130° C. The melt is strongly agitated and the temperature is gradually raised to 140–150° C. It is held within these limits for a period of 2 hours, and is then poured into 2000 parts of water and the resulting solution thoroughly aerated.

The product may be removed by fitration and washed free from alkali with hot water. When dry it is a bronze black powder soluble in sulfuric acid to an olive brown solution. It may be dissolved in 250 parts of 98% sulfuric acid and held under agitation for several hours at room temperature. The product may be isolated and converted to a paste in a manner entirely similar to that described in Example I. It is soluble in alkaline hydrosulfite to a violet vat from which cotton is dyed in somewhat redder shades of gray to black than those of the product of Example I. Dyeings and prints exhibit very good general fastness properties.

Example III

A melt is prepared consisting of 150 parts of caustic potash and 65 parts of anhydrous methanol. 25 parts of the condensation product of 4-amino-anthraquinone-2,1(N)-benzacridone and Bz-1-bromo-benzanthrone are introduced into the melt at 140–145° C. The mass is held under strong agitation at 145–150° C. for 2 hours, then poured into 3000 parts of water and the solution thoroughly aerated. The product is filtered off and washed free from alkali.

After drying it may be dissolved in 250 parts of 98% sulfuric acid. The solution is at first a violet brown but gradually changes to a slightly greenish brown. After several hours it is poured into 4000 parts of water. The product is filtered off, washed with hot water until free from acid and thoroughly milled to yield a smooth aqueous paste. In this form it is soluble in alkaline hydrosulfite giving a violet black vat from which cotton is dyed in level gray shades.

Example IV

Into a melt of essentially the same proportions of caustic potash and methanol as in Example I, there is introduced at 135–140° C. 30 parts of the condensation product of a mixture of 5-amino- and 8-amino-anthraquinone-2,1(N)-benzacridones and Bz-1-bromo-benzanthrone. The melt is held for 1 hour under strong agitation at 140–145° C. It is then poured into water and the product is isolated as described in Example I.

There is thus obtained a mixture of the products of Examples I and II. It differs in no respect from a mechanical mixture of the separate components and when converted to a paste from sulfuric acid, dyes in deep reddish gray to black shades from a violet vat.

Example V

A melt is prepared by heating 100 parts of caustic potash in 40 parts of methanol at 135° C. There is then added under agitation at 135–140° C. 20 parts of the condensation product of two moles of 5-amino-anthraquinone-2,1(N)-benzacridone with one mole of 6,Bz-1-dibromo-benzanthrone. The melt is held at 140–145° C. for 1½ hours after which it is poured into 2000 parts of water. The resulting solution is aerated and the product removed by filtration. It is washed free from alkali and dried.

The dried product may be dissolved in 200 parts of 98% sulfuric acid wherein it yields a pure olive brown solution. After stirring several hours, the solution becomes green. It is drowned in 4000 parts of water and the product isolated by filtering and washing with hot water. The filter cake may be milled to a smooth aqueous paste which is suitable for dyeing or printing. It is soluble in alkaline hydrosulfite to yield a violet vat from which cotton is dyed in very reddish gray to black shades.

Example VI

A melt is prepared by introducing 225 parts of anhydrous aniline into a suitable reaction vessel equipped with strong agitation and a reflux condenser. Air should be replaced by nitrogen gas and a slow current of the latter allowed to pass through the reaction chamber throughout the fusion. There is then added 0.2 part of a nickel catalyst and finally, at 145–155° C. 25 parts of sodium metal. Heating is continued until the sodium is completely dissolved. Then at 160–165° C. 10 parts of the condensation product of 8-amino-anthraquinone-2,1(N)-benzacridone and Bz-1-bromo-benzanthrone are added. Heating is continued for 1 hour at 165–170° C.

The melt may be poured into 500 parts of cold water and the aniline removed by steam distillation. The product is removed by filtration and washed free from alkali. When dried and converted to a paste by the method described in the previous examples, the product closely resembles that of Example II. It yields dyeings which tend to be somewhat redder and duller than those from the latter but are otherwise very similar.

When the condensation product of 5-amino-anthraquinone-2,1(N)-benzacridone and Bz-1-bromo-benzanthrone is fused in a similar melt under exactly the same conditions, a product more nearly similar to that of Example I is obtained.

*Example VII*

25 parts of sodium metal are heated in 350 parts of aniline in an atmosphere of nitrogen gas and in the presence of a trace of nickel catalyst. When the solution is complete, there is added very slowly at 170–175° C. the theoretical amount of absolute alcohol to form anhydrous sodium ethylate. The sodium ethylate formed precipitates as a gelatinous mass suspended in the aniline. There is then added at 165–170° C. 10 parts of the condensation product of 8-amino-anthraquinone-2,1(N)-benzacridone and Bz-1-bromo-benzanthrone. The temperature is held for 1½ hours at 165–170° C.

The melt is poured into an excess of cold water and the aniline removed by steam distillation. The product is filtered off and washed free from alkali with hot water and dried. The product appears to be identical with the product of Example VI.

A variety of alcohols might be used to replace those described in the examples. The ratio of caustic potash to alcohol will depend largely upon the nature of the alcohol employed and the temperature at which the fusion is to be made.

The acid treatment of the condensation product may be carried out in concentrated sulfuric acid of 90 to 99% at temperatures from about 10 to about 80° C., depending upon the particular concentration of acid used. The use of 98% acid at room temperatures is preferred.

I claim:

1. The dyestuffs obtainable by the alkaline condensation of Bz-1-benzanthronyl-alpha-anthraquinone-2,1(N)-benzacridone imides which are black powders when in powdered form and which yield olive brown to brown solutions in concentrated sulfuric acid, changing in color in such sulfuric acid solution upon standing or when heated to olive to green, and which yield violet colored alkaline hydrosulfite vats, from which cotton is dyed in gray to black shades of good fastness properties.

2. The dyestuff obtainable by the alkaline condensation of Bz-1-benzanthronyl-5-anthraquinone-2,1(N)-benzacridone imide.

3. The dyestuff obtainable by the alkaline condensation of the benzanthronyl-anthraquinone-benzacridone imide of the formula:

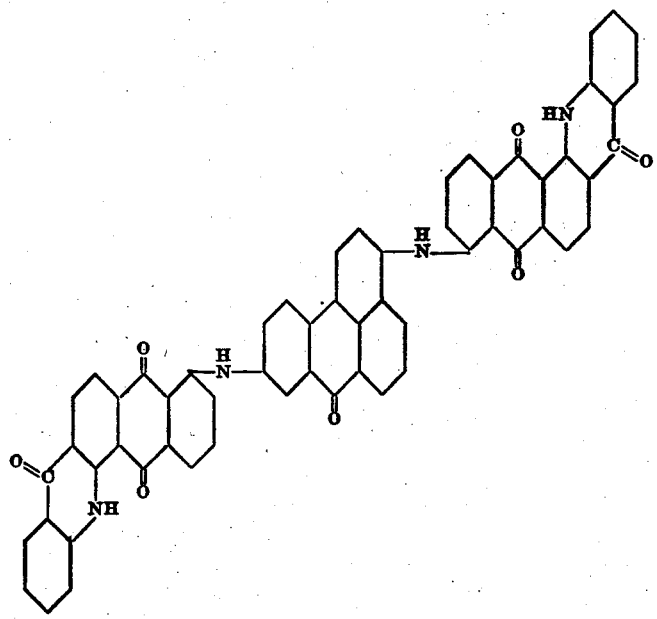

4. The dyestuff obtainable by the alkaline condensation of Bz-1-benzanthronyl-8-anthraquinone-2,1(N)-benzacridone imide.

5. The process which comprises heating a Bz-1-benzanthronyl-alpha-anthraquinone-2,1(N)-benzacridone imide with an alkaline condensing agent, at temperatures of from about 100° to about 180° C.

6. The process which comprises heating a Bz-1-benzanthronyl-alpha-anthraquinone-2,1(N)-benzacridone imide with an alkaline condensing agent, at temperatures of from about 100° to 180° C., isolating the resulting dyestuff and treating the same with concentrated sulfuric acid.

7. The process which comprises heating a Bz-1-benzanthronyl-alpha-anthraquinone-2,1(N)-benzacridone imide in the presence of alcoholic potash, at a temperature ranging from 120–160° C., isolating the product and treating the same with concentrated sulfuric acid at ordinary room temperatures.

WILLIAM H. LYCAN.